E. B. FAHNESTOCK.
SPRING FASTENING DEVICE.
APPLICATION FILED OCT. 4, 1911.
1,221,713.
Patented Apr. 3, 1917.
2 SHEETS—SHEET 1.
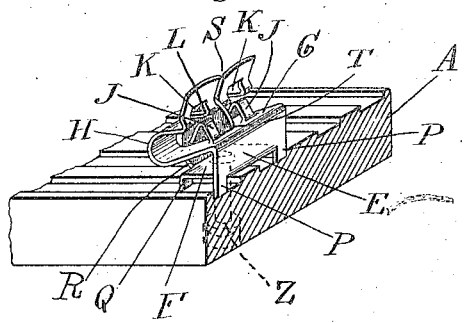
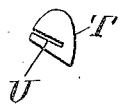
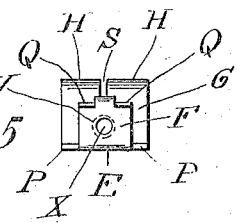
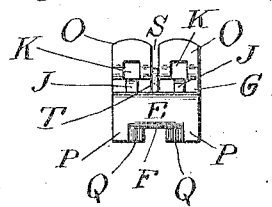
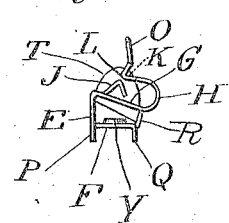
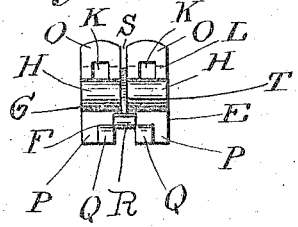
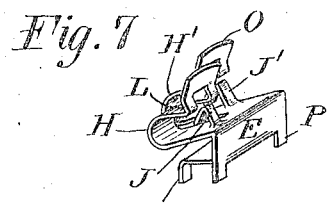
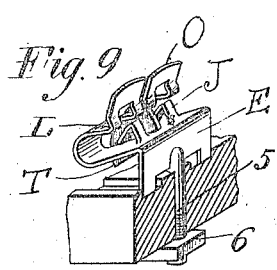
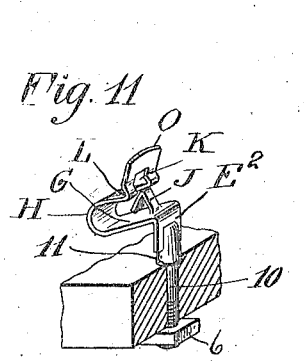
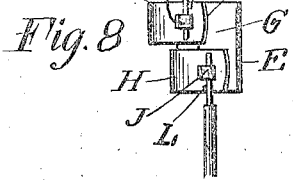
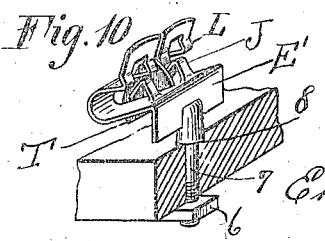

E. B. FAHNESTOCK.
SPRING FASTENING DEVICE.
APPLICATION FILED OCT. 4, 1911.
1,221,713.
Patented Apr. 3, 1917.
2 SHEETS—SHEET 2.
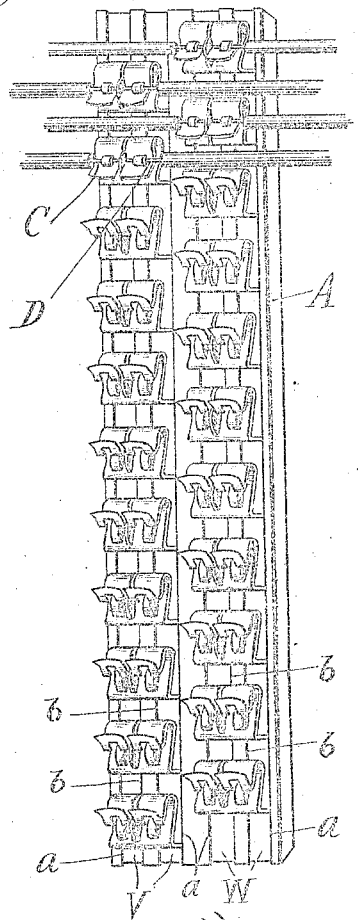
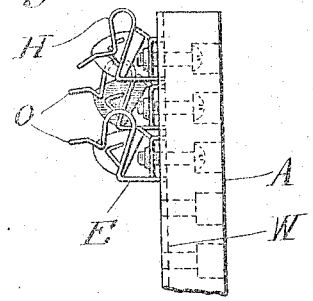
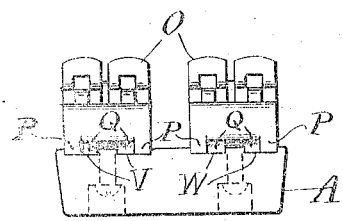
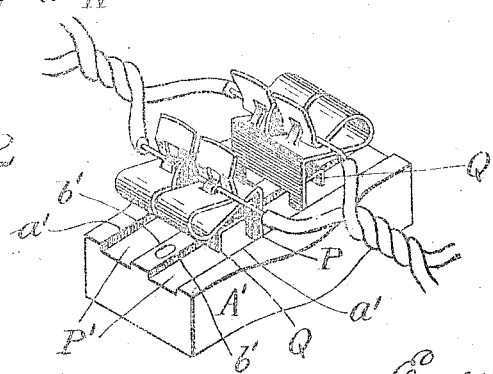
WITNESSES
INVENTOR
Ernest B. Fahnestock
BY Herbert G. Ogden
his ATTORNEY

UNITED STATES PATENT OFFICE.

ERNEST BENJAMIN FAHNESTOCK, OF BROOKLYN, NEW YORK.

SPRING FASTENING DEVICE.

1,221,713. Specification of Letters Patent. Patented Apr. 3, 1917.

Application filed October 4, 1911. Serial No. 652,679

*To all whom it may concern:*

Be it known that I, ERNEST B. FAHNE-STOCK, a citizen of the United States, and a resident of the borough of Brooklyn, county of Kings, city and State of New York, have invented certain new and useful Improvements in Spring Fastening Devices, of which the following is a specification accompanied by drawings.

This invention relates to spring fastening devices and the primary object of the invention is to provide a device of this character intended for use more particularly in electrically connecting a plurality of conducting wires at a given point, or location, to an equal number of wires terminating at the same point, as for instance, in connecting one telephone cable to another, or in connecting a telephone cable to a plurality of branching or distributing wires equal in number to those comprising the cable.

Another object of the invention is to produce a spring fastening device especially designed and constructed for mounting upon a base or support either singly, or in pairs, or in rows, or in any other desired arrangement for connecting the conducting wires, depending upon the conditions to be met.

Further objects of the invention are to prevent the fastening device or devices from becoming twisted or loosened upon the insulating base or support, enable a greater number of fastening devices to be arranged end to end in rows in a given space, and reduce surface leakage due to dirt and moisture collecting on the base.

Each fastening device is preferably constructed in duplex form, having a plurality of independently operatable electrically connected parts, each adapted to firmly hold a conducting wire, thereby maintaining an electric circuit between the wires so held and in order to render the operation of the device certain, even with careless handling, means are provided for preventing interference with the operation of one part by the insertion of a wire in the other part.

To these ends the invention consists of the device substantially as hereinafter described and claimed in this specification and shown in the accompanying drawings, in which—

Figure 1 is a perspective view of a spring fastening device embodying the invention;

Fig. 2 is an elevation of one end;

Fig. 3 is a side elevation;

Fig. 4 is an elevation of the other end;

Fig. 5 is a bottom plan view;

Fig. 6 is a detail view of a dividing partition;

Fig. 7 is a perspective view of a modification;

Fig. 8 is a top plan view of Fig. 7;

Figs. 9, 10 and 11 are perspective views of modifications of the device;

Fig. 12 is a perspective view of the application of the clamp to one form of connecting block;

Fig. 13 is a perspective view of the application of the clamp to another form of connecting block or strip;

Fig. 14 is a partial side view of Fig. 13; and

Fig. 15 is an end view of Fig. 13.

Referring more particularly to Figs. 1 to 6 inclusive, the detail construction of the preferred form of spring fastening device is shown, preferably formed in one piece, from a strip of sheet metal, although the device may be made in as many pieces as desired and out of any suitable form of material.

The fastening device comprises a supporting member E, arranged to stand at approximately right angles to an insulating base or support, one end of said supporting member E being slit at each side and bent to form a securing member F. The supporting member E is provided with the legs P and the securing member F has two legs Q projecting therefrom, so that the device is adapted to stand upon the legs P and Q. The other end of the supporting member E is bent to form a body member G situated opposite the securing member F and divided at S and looped upon itself to form two independently operatable spring members H, said spring members H being bent in a direction reverse to the loops to form thumb pieces O. The body member G has projecting from it resistant members J adapted to co-act with the spring members H to clamp the conductors. The spring members H are provided with slots K adapted in this instance to pass over the resistant members J. The junctions of the looped portions of the spring members with the reversely bent thumb pieces O form angular retaining portions L in which the conducting wires are adapted to lie.

In order to insert the wires into the device, pressure is applied upon one of the finger pieces O, forcing the slot K over the corresponding resistant member J and the terminal is inserted through said resistant member, upon which the spring member is released, thereby firmly gripping and holding the terminal in defined position in the angular retaining portion L. In inserting one wire in one part of the spring fastening device, the end of the wire is apt to project too far transversely across the fastening device beyond the dividing slot S and interfere with the proper operation of the other part of the fastening device. If the wire should project too far, the other spring member cannot be manipulated, because said wire would prevent the spring member from being forced downwardly far enough to permit the insertion of the opposite wire. I therefore provide means for preventing the insertion of a wire in one part of the device from interfering with the proper operation of the other part of the device. In Fig. 6 I have shown a partition T preferably of metal and slotted at U. This partition is adapted to be inserted in the spring fastening device from the rear in the slot S between the spring members. The slot U of the partition passes over the body portion G in the position indicated in Figs. 1 and 3. The short tongue R provided for this purpose on the securing member F, is then bent upwardly as indicated in Fig. 1, holding the partition in place. The partition T limits the extent to which a terminal may be inserted transversely in the spring fastening device and prevents interference by one terminal at one side of the partition with the operation of the spring member at the opposite side of the partition.

Suitable means are provided for holding the fastening devices upon a base or support, in this instance the securing member F being provided with an aperture X preferably punched out of the metal and the bur Y formed around the hole is preferably interiorly screw threaded to receive the tip of a screw Z. The screw is adapted to be passed through the base from the rear and hold the spring fastening device tightly upon the base. By this means a spring lock is in effect formed between the screw Z and the securing member F, because as the screw is tightened the metal of the securing member F is flexed and reacts to tighten the threads of the bur upon the tip of the screw. Any other suitable means may be provided for holding the fastening device upon a base.

In Figs. 7 and 8 I have shown a modified form of construction so devised that interference with the operation of one part by the insertion of a member in the other part is prevented without the use of the divided partition T. In this modification one spring member H' is offset longitudinally from the other spring member H. The resistant member J' coöperating with the spring member H' is located at a greater distance from the supporting member E than the distance between the resistant member J and the supporting member E. By this means the resistant member J' is brought opposite the looped portion of the spring member H and if a wire is inserted farther than necessary in the part H', said wire will project through the loop of the part H and will not interfere with the proper operation of said part H.

In Fig. 9 a modification of the device is shown in which the securing member is omitted and the supporting member E is provided with a bolt 5 suitably fastened to the supporting member E as by means of solder and adapted to be secured to the base or support as by means of the nut 6.

In the modification shown in Fig. 10, the securing member is omitted and the legs of the supporting member E' are omitted. Said member E' is provided with the bolt 7 suitably secured thereto as by means of solder and provided with the shoulders 8 adapted to bear upon the base or support.

In the modification of the invention shown in Fig. 11, a single fastening device is shown having the supporting member E² provided with the bolt 10 suitably secured thereto as by means of solder and provided with the shoulders 11 adapted to bear upon the base or support. If a plurality of single spring fastening devices are secured to a base or support, it is desirable to maintain the body members out of contact with the base or support for the same reasons that it is desirable to maintain the body members of the double devices out of contact with the base or support, and the function of the supporting member which supports the spring fastening device is the same in all the modifications shown.

In Fig. 12, one use of the fastening device is shown adapted to connect the terminals of two wires to the terminals of two corresponding wires. A' represents a block of suitable insulating material preferably provided with the longitudinal grooves P'. The two spring fastening devices are mounted upon the block A' with the legs P and Q in said grooves. The legs P as shown bear against the edges a' of the grooves, while the legs Q bear against the opposite edges b' of the grooves. The fastening devices cannot therefore be twisted after being mounted in place, but are maintained firmly in proper relation. Obviously, any other suitable means could be devised for maintaining the proper relations between the spring fastening devices and the insulating block A'. Another application of the invention is shown in Figs. 13, 14 and 15, in which A represents a block or strip of suitable insulating material, preferably porcelain, of greater length than width, constituting the base or support. The spring fastening devices as shown in this instance are mounted in longitudinal rows upon the base A, and each row is preferably arranged in staggered relation to the adjacent row, so that the conductor terminals C and D to be electrically connected may be inserted in the fastening devices from each side transversely to the longitudinal axis of the block or strip. The block or strip is preferably secured vertically in the proper location and as many connecting blocks or strips may be used as, necessary. They may also be arranged horizontally or in any other position, as the necessities of the case may require, but in the drawings, the base A is presumed to be secured vertically against a wall or other support. By means of such a cable connecting block or strip a plurality of conducting wires at a given point may be electrically connected to an equal number of wires terminating at the same point.

Suitable means are provided for maintaining the fastening devices in proper position, in this instance the block A being provided with longitudinally extending grooves V and W and the spring fastening devices are mounted upon the base A with the legs P and Q in said grooves. One row of devices are mounted in the grooves V and another row in the grooves W. The legs P of the devices are adapted to bear against the edges $a$ of the grooves, while the legs Q bear against the opposite edges $b$ of the grooves, thus preventing the devices from being twisted.

In order to economize space and material and afford provision for mounting as many fastening devices as possible in a row within a given length, I prefer to form each fastening device with the body member G inclined at an angle toward the base A. The body members are therefore inclined away from a plane parallel to the insulating base and toward the base and by this means space in a longitudinal direction is economized and the fastening devices are easier to operate when the strip is placed vertically. As Figs. 13 and 14 are viewed, it will be seen that the thumb pieces O extend outwardly at substantially a right angle to the plane of the base A and this construction is provided in order to afford increased leverage in manipulating the spring members when the assembled device is mounted in position. By mounting the fastening devices upon the legs P and Q, thus maintaining the body members F out of contact with the base, surface leakage due to dirt and moisture collecting on the insulating base is greatly reduced, which is a feature of importance.

I claim and desire to obtain by Letters Patent the following:

1. A spring fastening device for electrically connecting a plurality of conducting wires, comprising a plurality of independently operatable spring parts arranged side by side and electrically connected, each part adapted to hold firmly a conducting wire, thrust therethrough transversely of the spring parts of the fastening device, thereby maintaining an electric circuit between the wires so held, and means for preventing interference with the operation of one spring part by the insertion of a wire transversely in the other spring part.

2. A spring fastening device for electrically connecting a plurality of conducting wires, comprising a body member, a plurality of independently operatable spring members arranged side by side and electrically connected, a plurality of resistant members coöperating with the spring members and means for preventing interference with the operation of one spring member by the insertion of a wire transversely of the body member of the fastening device in the other spring member.

3. A spring fastening device for electrically connecting a plurality of conducting wires, comprising a plurality of independently operatable electrically connected parts, each adapted to hold firmly a conducting wire, thereby maintaining an electric circuit between the wires so held, and a dividing partition between the two parts of the fastening device, whereby interference with the operation of one part by the insertion of a wire in the other part is prevented.

4. A spring fastening device for electrically connecting a plurality of conducting wires, comprising a body member, a plurality of independently operatable spring members electrically connected, a plurality of resistant members coöperating with the spring members, and a dividing partition between the two spring members, whereby interference with the operation of one spring member by the insertion of a wire in the other spring member is prevented.

5. A spring fastening device, comprising a supporting member adapted to stand at approximately right angles to a support, a body member attached to said supporting member, thereby being maintained out of contact with said support, said body member being longitudinally slotted at its free end and looped on itself to form two independently operatable spring members lying side by side.

6. A spring fastening device, comprising a supporting member arranged to stand at approximately right angles to a support, a body member attached to said supporting member, and thereby capable of being maintained out of contact with said support, stationary hook-shaped resistant members projecting upward from the body member, and electrically connected opposing spring members projecting upwardly from the body member at the forward end of the body member, then downwardly toward the resistant members and in proximity thereto, then upwardly away from the body member.

7. A spring fastening device, comprising a supporting member arranged to stand at approximately right angles to a support, one end of said supporting member being slit and bent to form a securing member and supporting legs, the other end of said supporting member being bent to form the body member of the spring fastening device, said body member being situated opposite the securing member and being divided and looped upon itself to form two independently operatable spring members electrically connected, said spring members being bent in a direction reverse to the loops, said body member having projecting from it resistant members adapted to coact with said spring members to clamp the conductors, and means for preventing interference with the operation of one spring member by the insertion of a wire transversely of the fastening device in the other spring member.

8. A spring fastening device, comprising a supporting member having one end slit and bent to form a securing member and supporting legs for maintaining the remainder of the device out of contact with a support, the other end bent to form a body member, the body member being situated opposite the securing member and being divided and looped upon itself to form two independently operatable spring members electrically connected, said body member having projecting from it resistant members adapted to co-act with said spring members.

9. A spring fastening device for electrically connecting a plurality of conducting wires, comprising a plurality of independently operatable electrically connected spring parts, each adapted to firmly hold a conducting wire, thereby maintaining an electric circuit between the wires so held and supporting legs for said fastening device for maintaining the remainder of the device out of contact with a support.

10. A spring fastening device for electrically connecting a plurality of conducting wires, comprising a plurality of independently operatable electrically connected parts, each adapted to firmly hold a conducting wire, thereby maintaining an electric circuit between the wires so held, a securing member provided with a screw threaded aperture, a screw for holding said securing member upon a base or support, and supporting legs for said device for maintaining the remainder of the device out of contact with a support.

11. A spring fastening device for electrical conductors, comprising a securing member formed of sheet metal having greater width than thickness and provided with legs at each side to maintain the securing member out of contact with a support, and a body member extending over said securing member and looped on itself to form a spring member.

12. A spring fastening device for electrical conductors, comprising a securing member formed of sheet metal having greater width than thickness and provided with legs at front and back to maintain the securing member out of contact with a support, and coöperating members for clamping a conductor extending over said securing member.

13. A connecting block for electrically connecting the terminals of one set of conducting wires at one side of a support to the terminals of another set at the other side, comprising a base of insulating material, and rows of spring fastening devices mounted thereon, each row in staggered relation to the adjacent row, each fastening device having a plurality of independently operatable electrically connected parts maintained out of contact with the support and adapted to receive and firmly hold the conducting wires when thrust end to end into the fastening device from both sides transversely to the fastening device and transversely to the direction of extent of the rows of said devices.

14. A connecting block, for electrically connecting the terminals of one set of conducting wires at one side of a support to the terminals of another set at the other side, comprising a base of insulating material, and spring fastening devices mounted thereon, said fastening devices having legs adapted to support the main body portions of the devices out of contact with the insulating base.

15. A connecting block, for electrically connecting the terminals of one set of conducting wires at one side of a support to the terminals of another set at the other side, comprising a base of insulating material, spring fastening devices mounted thereon, said fastening devices having legs adapted to support the main body portions of the devices out of contact with the insulating base, and means on the base coöperating with the legs to prevent the fastening devices from turning.

16. A connecting block, for electrically connecting the terminals of one set of conducting wires at one side of a support to the terminals of another set at the other side, comprising a base of insulating material having greater length than width, and rows of spring fastening devices mounted longitudinally thereon, each fastening device having a plurality of independently operatable parts electrically connected, each part adapted to hold firmly a conducting wire, the body portions of each part of said fastening devices being inclined toward the base and away from a plane parallel to the insulating base, thereby affording provision for arranging a greater number of said devices in a row in a given length.

In testimony whereof I have signed this specification in the presence of two subscribing witnesses.

ERNEST BENJAMIN FAHNESTOCK.

Witnesses:
    HENRY SHELDON,
    A. C. PARHAM.